United States Patent [19]

Hoefer et al.

[11] Patent Number: 5,030,280

[45] Date of Patent: Jul. 9, 1991

[54] USE OF NONIONIC SURFACTANTS FOR PREVENTING THE FOGGING OF PLASTIC SURFACES AND PREPARATIONS CONTAINING THESE SURFACTANTS

[75] Inventors: Rainer Hoefer, Duesseldorf; Dieter Krampitz, Monchen-Gladbach, both of Fed. Rep. of Germany

[73] Assignee: Henkel Kommanditgesellschaft auf Aktien, Duesseldorf, Fed. Rep. of Germany

[21] Appl. No.: 343,480

[22] Filed: Apr. 26, 1989

[30] Foreign Application Priority Data

Apr. 28, 1988 [DE] Fed. Rep. of Germany ....... 3814456

[51] Int. Cl.$^5$ .............................................. C09K 3/18
[52] U.S. Cl. ......................................... 106/13; 252/70
[58] Field of Search ................... 427/393.5; 428/411.1, 428/412; 106/13; 252/70

[56] References Cited

U.S. PATENT DOCUMENTS

| | | | |
|---|---|---|---|
| 2,489,026 | 11/1949 | Gilbert | 106/13 |
| 3,392,133 | 7/1968 | Stickelmeyer | 260/29.6 |
| 3,479,308 | 11/1969 | Gattenby et al. | 260/23 |
| 3,712,875 | 1/1973 | Tijunelis | 260/23 |
| 3,856,534 | 12/1974 | Fletcher et al. | 106/13 |
| 4,374,745 | 2/1983 | Sibley et al. | 252/106 |
| 4,576,864 | 3/1986 | Krautter et al. | 428/328 |
| 4,792,492 | 12/1988 | Lee | 428/411.1 |
| 4,913,967 | 4/1990 | Bilhorn | 420/411.1 |

FOREIGN PATENT DOCUMENTS

| | | |
|---|---|---|
| 0149182 | 12/1984 | European Pat. Off. . |
| 3129262 | 2/1983 | Fed. Rep. of Germany . |
| 3229282 | 5/1983 | Fed. Rep. of Germany . |
| 2141125 | 3/1984 | United Kingdom . |

OTHER PUBLICATIONS

Chem. Abstr. 83:148 446 (equiv. to JA 7,540,643); Chem. Abstr. 92:7410 (equiv. to JA 7,986,545; Chem. Abstr. 89:164 433 (equiv. to JA 7,869,247); Chem. Abstr. 98:162 086 (equiv. to DE 3,129,262); Schoenfeldt, Grenzflaechenaktive Ethylenoxid-Addukte (1976), pp. 209-218; Fett Wissenschaft Technologie/Fat Science Techn. 89 (3) pp. 106-111.
Chem. Abstract 98: 162086h, vol. 98, 1983.

Primary Examiner—Michael Lusignan
Attorney, Agent, or Firm—Ernest G. Szoke; Wayne C. Jaeschke; Real J. Grandmaison

[57] ABSTRACT

Nonionic surfactants which are liquid at ambient temperature and have an HLB value of from 2 to less than 13 are used for preventing the fogging of plastic surfaces and afford effective washproof protection against fogging.

24 Claims, No Drawings

USE OF NONIONIC SURFACTANTS FOR PREVENTING THE FOGGING OF PLASTIC SURFACES AND PREPARATIONS CONTAINING THESE SURFACTANTS

BACKGROUND OF THE INVENTION

1. Field of the Invention

This invention relates to the use of nonionic surfactants which are liquid at ambient temperature and have an HLB value of from 2 to less than 13, preferably from 2 to less than 12, for preventing the fogging of plastic surfaces.

2. Discussion of Related Art

It is known that numerous individual droplets are formed very easily from water vapor, for example on packaging films of flexible PVC, but do not coalesce to form a continuous film of water. In the case of flexible PVC films, for example of the type used for the packaging of fresh meat or fresh fruit, U.S. Pat. No. 3,479,308, France 1,569,130 and Japan 75 40 643, 79 86 545 and 78 69 247 describe various solutions to this problem by using highly ethoxylated sorbitan monooleates for example as so-called anti-fogging agents. However, this solution cannot be applied to plastic glazing in greenhouses, on terraces or the like.

From the considerably increased formation of water droplets on surfaces or, or even inside, double-walled sheets of polymethylmethacrylate or polycarbonate compared with glass, the permeability to light of plastic glazing of the above-mentioned polymers is considerably reduced so that plant growth in greenhouses is impaired. Fogging by water droplets is also aesthetically unattractive, and the falling of droplets onto the petals of delicate cultivated plants can lead to unwanted staining.

There has been no shortage of attempts in the past to solve the problem of fogging of plastic glazing. It has mainly been proposed in this regard that the surface of the plastic glazing be provided with a firmly adhering, film-forming coating, cf. German 31 29 262, European 149,182 and the earlier prior art cited therein.

However, the application of a coating which can be readily wetted with water requires a separate operation. In addition, in the case of double-walled sheets for example, the surfaces of the hollow interior would be virtually impossible to coat.

DESCRIPTION OF THE INVENTION

Other than in the operating examples, or where otherwise indicated, all numbers expressing quantities of ingredients or reaction conditions used herein are to be understood as modified in all instances by the term "about".

Accordingly, the present invention relates to an externally applicable preparation for preventing the fogging of plastic surfaces, particularly plastic glazing, based on polymethyl methacrylate or polycarbonate, which is not applied in the form of a solid film-forming coating, but instead may be applied to the surface in liquid form, for example by means of a cloth, by spraying or the like.

According to the invention, this afore-mentioned problem is solved by using the earlier-mentioned nonionic surfactants which are liquid at ambient temperature and have an HLB value of from 2 to less than 13, and more especially from 2 to less than 12.

The solution according to the invention has the advantage so far as the plastics manufacturer is concerned that no separate production lines have to be set up for the coating of plastic surfaces, for example after extrusion. In addition, the user is afforded the advantage of simple application which may be repeated at controlled intervals, mechanically adhering soil being removed in a single operation.

Since the fogging of plastic surfaces is attributable to the surface tension of water with respect to plastics, products generally known as good wetting agents from detergent formulations ought to be suitable as anti-fogging agents. However, it has surprisingly been found that, although these commercially available products do have the favorable wetting effect expected, they are washed off after a very short time, for example by rain water or water of condensation. The same problems arise with known external antistatic agents, such as paraffin sulfonate, alkyl ether phosphates or quaternary ammonium compounds. The ethoxylated sorbitan esters effective in PVC films also proved to be completely or substantially ineffectual because they have to be reapplied after only a very short time.

Although the nonionic surfactants to be used in accordance with the invention, which are liquid at ambient temperature and have an HLB value of from 2 to less than 13 and more especially from 2 to less than 12, have a surface-active effect, they are surprisingly removed only very slowly, if at all, from plastic glazing, even after repeated exposure to rainfall.

In the context of the invention, an HLB value is the HLB value determined by Griffin's method, cf. N. Schönfeldt "Grenzflächenaktive Ethylenoxid-Addukte (Surface-Active Ethylene Oxide Adducts)", Wissenschaftliche Verlagsgesellschaft mbH Stuttgart 1976, pages 209–218.

The following are preferred nonionic surfactants according to the invention which are liquid at ambient temperature and have an HLB value of from 2 to less than 13 and more especially from 2 to less than 12:

1. adducts of 1 to 6 mol of ethylene oxide with 1 mol of linear or branched, saturated or unsaturated $C_{8-18}$ fatty alcohols;

2. adducts of 1 to 7 mol of ethylene oxide and 1 to 4 mol of propylene oxide with 1 mol of linear or branched, saturated or unsaturated $C_{8-18}$ fatty alcohols;

3. adducts of 1 to 8 mol of ethylene oxide with 1 mol of linear or branched, saturated or unsaturated $C_{8-18}$ fatty alcohols terminally blocked by etherification with linear or branched $C_{1-6}$ alkyl groups (for the nomenclature of the so-called "mixed ethers", see R. Piorr, R. Höfer, H.J. Schlüßler, K.H. Schmid, Fett.-Wiss. Technologie/Fat Sai. Techn. 89 (3), 108–111 (1987);

4. adducts of 1 to 6 mol of ethylene oxide with 1 mol of linear or branched, saturated or unsaturated $C_{8-18}$ fatty amines;

5. adducts of 1 to 7 mol of ethylene oxide and 1 to 4 mol of propylene oxide with 1 mol of linear or branched, saturated or unsaturated $C_{8-18}$ fatty amines;

6. adducts of 1 to 8 mol of ethylene oxide with 1 mol of linear or branched, saturated or unsaturated $C_{8-18}$ fatty amines terminally blocked by etherification with linear or branched $C_{1-6}$ alkyl groups;

7. adducts of 1 to 6 mol of ethylene oxide or 1 to 7 mol of ethylene oxide and 1 to 4 mol of propylene oxide with 1 mole of alkyl phenols having 1 to 3 $C_{4-12}$ alkyl groups;

8. adducts of 1 to 8 mol of ethylene oxide with 1 mole of alkyl phenols having 1 to 3 $C_{4-12}$ alkyl groups and terminally blocked by etherification with linear or branched $C_{1-6}$ alkyl groups;

9. esters, particularly partial esters, of saturated or unsaturated, linear or branched $C_{8-24}$ fatty acids with diglycerol or polyglycerol;

10. diesters of saturated or unsaturated, linear or branched $C_{8-24}$ fatty acids with polyethylene glycols, polypropylene glycols or mixed ethylene oxide/propylene oxide block copolymers having a number average molecular weight in the range from 44 to 600.

The nonionic surfactants mentioned above are commercially available products. The products mentioned under 3, optionally in admixture with the products mentioned under 1, 2, 4, 5, 6 and/or 7, are particularly preferred for the purposes of the invention by virtue of their low-foaming character and their particularly good biodegradability.

The fatty alcohol derivatives mentioned in connection with nonionic surfactants nos. 1 to 3 in the above list are derived from fatty alcohols of synthetic and, in particular, natural origin; the natural fatty alcohols are produced from natural, vegetable and/or animal fats. Typical representatives of these fatty alcohols are capryl alcohol, capric alcohol, lauryl alcohol, myristyl alcohol, cetyl alcohol, stearyl alcohol, oleyl alcohol, elaidyl alcohol, ricinoleic alcohol, linoleyl alcohol and linolenyl alcohol. In accordance with standard practice in surfactant chemistry, they are generally not used in the form of the individual compounds, but rather in the form of technical grade mixtures with other fatty alcohols having chain lengths in the above-mentioned range. Typical representatives of branched fatty alcohols are the so-called Guerbet alcohols.

The fatty amines mentioned under nos. 1 to 4 of the above list are derived from the fatty amines corresponding to the above-mentioned fatty alcohols.

Typical representatives of the alkylaryl derivatives mentioned above under nos. 7 and 8 are $C_9$ alkylphenols, $C_8$ alkylphenols, $C_{12}$ alkylphenols, 2,4,6-tributylphenol, benzyl-substituted phenols, phenoxy-substituted phenols and the like.

The $C_{8-24}$ fatty acids on which the fatty acid derivatives mentioned above under nos. 9 and 10 are based are also of synthetic or, in particular, natural origin; the natural fatty acids are again obtainable from animal and/or natural fats. Typical representatives of these fatty acids are caprylic acid, capric acid, lauric acid, myristic acid, palmitic acid, stearic acid, lauroleic acid, myristoleic acid, palmitoleic acid, oleic acid, gadoleic acid, erucic acid, behenic acid, ricinoleic acid, linolic acid and linolenic acid and also branched fatty acids, such as isostearic and isopalmitic acid and the like. In accordance with standard practice in surfactant chemistry, the suitable fatty acids are used in the form of technical grade mixtures with other fatty acids having chain lengths in the range mentioned above.

Where mixed-alkoxylated surfactants are mentioned in the above list, the ethylene oxide and propylene oxide units may be distributed in blocks or at random in the polyalkylene oxide chain.

The $C_{1-6}$ alkyl groups mentioned in connection with surfactants 3, 6 and 8 may be, in particular, methyl, ethyl, propyl, butyl, pentyl and/or hexyl groups.

The present invention also relates to a preparation for preventing the fogging of plastic surfaces containing 1 to 15% by weight of nonionic surfactants which are liquid at ambient temperature and have an HLB value of 2 to less than 13 and more especially from 2 to less than 12, 85 to 99% by weight of water-miscible solvents for the nonionic surfactants or a mixture of 70 to 95% by weight of said solvents and 30 to 5% by weight of water. Suitable watermiscible solvents are, in particular, lower alcohols, particularly ethanol, n-propanol and i-propanol.

The invention is described in more detail in the following with reference to preferred Examples and test results, including those obtained with comparison compounds.

Testing of the anti-fogging effect

Test solutions

Solutions of 3 g anti-fogging agent (surfactant) in 97 g of an alcohol/water mixture consisting of 10 parts by weight water, 20 parts by weight ethanol and 70 parts by weight isopropanol were used for the test.

PMMA (polymethyl methacrylate) test specimens

PMMA double-walled plates having a surface area of 600 cm$^2$ (20×30 cm) were used as the test specimens. All plates were cleaned with water and alcohol before the test.

Application

Cloths were impregnated with the individual test solutions. The PMMA plates were then uniformly rubbed on one side with the cloths.

Procedure

The prepared PMMA plates were set up at an angle of approximately 60° and sprayed with water (spray bottle). The drainage behavior or adhesion of the water droplets was evaluated in accordance with the following scheme:

+++ = transparent plate with no visible water droplets
++ = individual droplets scattered at random
+ = droplets scattered at random or only large transparent droplets,
− = opaque layer of numerous small droplets Rinsing After each anti-fogging evaluation, the PMMA plates were individually placed under running water and rinsed with a quantity of 10 liters over a period of 1 minute. A total of four water treatments was carried out.

The surfactants listed in Table 1 were tested. Test no. 1 is a blank test with no added surfactant. Tests 2 to 11 include surfactants to be used in accordance with the invention, while tests 12 to 23 are comparison tests using commercially available surfactants having HLB values above 13. The numbers in brackets after the surfactants are the HLB values of the tested surfactants.

The test results are shown in Table 2.

TABLE 1

Test no.
1 blank test
2 lauryl alcohol + 3 EO (8.0)
3 lauryl alcohol + 4 EO (.5)
4 $C_{12-18}$ fatty alcohol + 3 EO (7.8)
5 lauryl alcohol + 5 EO n-butyl ether (9.4)
6 lauryl alcohol + 7 EO n-butyl ether (11.0)
7 laurylamine + 2 EO (6.2)
8 polyethylene glycol 400 dilaurate (10.2)
9 polypropylene glycol 700 distearate (8.3)

TABLE 1-continued 10 diglycerol $C_{8-10}$ fatty acid ester (11.9)
11 mixture of 50% layryl alcohol + 5 EO n-butyl ether and 50% nonylphenol + 4 EO (9.3)
12 sec. alkanesulfonate (above 20)
13 alkylphenol + EO phosphate (above 20)
14 sorbitan monolaurate (17.0)
15 sorbitan monolaurate + 20 4 EO (13.3)
16 sorbitan monooleate + 20 EO (15.0)
17 nonylphenol + 10 EO (13.4)
18 octylphenol + 43 EO (17.8)
19 commercially available surfactant mixture for dishwashing detergents (above 20)
20 polyethylene glycol 4000 distearate (17.5)

EO = moles ethylene oxide.

TABLE 2

| Surfactant no. | Anti-fogging effect | | | | |
|---|---|---|---|---|---|
| | Start | 1st rinse | 2nd rinse | 3rd rinse | 4th rinse |
| 1 | − | − | − | − | − |
| 2 | +++ | +++ | ++ | + | − |
| 3 | +++ | ++ | ++ | + | − |
| 4 | +++ | ++ | ++ | + | − |
| 5 | +++ | +++ | ++ | ++ | + |
| 6 | +++ | +++ | ++ | + | − |
| 7 | +++ | +++ | ++ | + | − |
| 8 | +++ | +++ | ++ | + | − |
| 9 | +++ | +++ | ++ | ++ | + |
| 10 | +++ | ++ | + | − | − |
| 11 | +++ | +++ | +++ | ++ | ++ |
| 12 | + | + | − | − | − |
| 13 | + | + | − | − | − |
| 14 | + | − | − | − | − |
| 15 | ++ | + | − | − | − |
| 16 | − | − | − | − | − |
| 17 | + | − | − | − | − |
| 18 | + | − | − | − | − |
| 19 | + | + | − | − | − |
| 20 | + | − | − | − | + |

Evaluation of the anti-fogging effect on PMMA double-walled plates
+ + + = transparent plate with no visible water droplets
+ + = a few droplets scatteded at random
+ = droplets scattered at random or only large transparent droplets
− = opaque layer of numerous small droplets.

We claim:

1. The process of preventing the fogging of a plastic surface comprising wetting the external surface of said plastic surface with a composition consisting of about 1% to about 15% by weight of a nonionic surfactant in liquid form at ambient temperature wherein said nonionic surfactant has an HLB value of from about 2 to less than about 13, and about 99 to about 85% by weight of water-miscible solvents for the nonionic surfactant or a mixture of 70 to 95% by weight of a water-miscible solvent for the nonionic surfactant and 30 to 5% by weight of water.

2. A composition for preventing the fogging of the external surface of a plastic surface comprising about 1 to about 15% by weight of a nonionic surfactant which is liquid at ambient temperature and has an HLB value of from about 2 to less than about 13, and about 99 to about 85% by weight of a water-miscible solvent for the nonionic surfactant.

3. The process as in claim 1 wherein said nonionic surfactant comprises an adduct of about 1 to about 7 moles of ethylene oxide and about 1 to about 4 moles of propylene oxide with 1 mole of linear or branched, saturated or unsaturated $C_{8-18}$ fatty alcohol.

4. The process as in claim 1 wherein said nonionic surfactant comprises an adduct of about 1 to about 8 moles of ethylene oxide with 1 mole of linear or branched, saturated or unsaturated, $C_{8-18}$ fatty alcohol terminally blocked by etherification with a linear or branched $C_{1-6}$ alkyl group.

5. The process as in claim 1 wherein said nonionic surfactant comprises an adduct of about 1 to about 6 moles of ethylene oxide with 1 mole of linear or branched, saturated or unsaturated, $C_{8-18}$ fatty amine.

6. The process as in claim 1 wherein said nonionic surfactant comprises an adduct of about 1 to about 7 moles of ethylene oxide and about 1 to about 4 moles of propylene oxide with 1 mole of linear or branched, saturated or unsaturated, $C_{8-18}$ fatty amine.

7. The process as in claim 1 wherein said nonionic surfactant comprises an adduct of about 1 to about 8 moles of ethylene oxide with 1 mole of linear or branched, saturated or unsaturated, $C_{8-18}$ fatty amine terminally blocked by etherification with a linear or branched $C_{1-6}$ alkyl group.

8. The process as in claim 1 wherein said nonionic surfactant comprises an adduct of about 1 to about 6 moles of ethylene oxide or about 1 to about 7 moles of ethylene oxide and about 1 to about 4 moles of propylene oxide with 1 mole of alkyl phenols having 1 to 3 $C_{4-12}$ alkyl groups.

9. The process as in claim 1 wherein said nonionic surfactant comprises an adduct of about 1 to about 8 moles of ethylene oxide with 1 mole of alkyl phenols having 1 to 3 $C_{4-12}$ alkyl groups and terminally blocked by etherification with a linear or branched $C_{1-6}$ alkyl group.

10. The process as in claim 1 wherein said nonionic surfactant comprises an ester of a saturated or unsaturated, linear or branched, $C_{8-24}$ fatty acid with diglycerol or polyglycerol.

11. The process as in claim 1 wherein said nonionic surfactant comprises a diester of a saturated or unsaturated, linear or branched $C_{8-24}$ fatty acid with polyethylene glycol, polypropylene glycol or mixed ethylene oxide/propylene oxide block copolymer having a number average molecular weight in the range from about 44 to about 600.

12. A composition for preventing the fogging of the external surface of a plastic surface consisting of about 1 to about 15% by weight of a nonionic surfactant which is liquid at ambient temperature and has an HLB value of from about 2 to less than about 13, and about 99 to about 85% by weight of a water-miscible solvent for the nonionic surfactant.

13. A composition for preventing the fogging of the external surface of a plastic surface consisting of about 1 to about 15% by weight of a nonionic surfactant which is liquid at ambient temperature and has an HLB value of from about 2 to less than about 13, and about 99 to about 85% by weight of water-miscible solvents for the nonionic surfactant or a mixture of 70 to 95% by weight of a water-miscible solvent for the nonionic surfactant and 30 to 5% by weight of water.

14. A composition as in claim 12 wherein said solvent is selected from ethanol and propanol.

15. A composition as in claim 12 wherein said nonionic surfactant comprises an adduct of about 1 to about 6 moles of ethylene oxide with 1 mole of linear or branched, saturated or unsaturated, $C_{8-18}$ fatty alcohol.

16. A composition as in claim 12 wherein said nonionic surfactant comprises an adduct of about 1 to about 7 moles of ethylene oxide and about 1 to about 4 moles of propylene oxide with mole of linear or branched, saturated or unsaturated $C_{8-18}$ fatty alcohol.

17. A composition as in claim 12 wherein said nonionic surfactant comprises an adduct of about 1 to about 8 moles of ethylene oxide with 1 mole of linear or branched, saturated or unsaturated, $C_{8-18}$ fatty alcohol terminally blocked by etherification with a linear or branched $C_{1-6}$ alkyl group.

18. A composition as in claim 12 wherein said nonionic surfactant comprises an adduct of about 1 to about 6 moles of ethylene oxide with 1 mole of linear or branched, saturated or unsaturated, $C_{8-18}$ fatty amine.

19. A composition as in claim 12 wherein said nonionic surfactant comprises an adduct of about 1 to about 7 moles of ethylene oxide and about 1 to about 4 moles of propylene oxide with 1 mole of linear or branched, saturated or unsaturated, $C_{8-18}$ fatty amine.

20. A composition as in claim 12 wherein said nonionic surfactant comprises an adduct of about 1 to about 8 moles of ethylene oxide with 1 mole of linear or branched, saturated or unsaturated, $C_{8-18}$ fatty amine terminally blocked by etherification with a linear or branched $C_{1-6}$ alkyl group.

21. A composition as in claim 12 wherein said nonionic surfactant comprises an adduct of about 1 to about 6 moles of ethylene oxide or about 1 to about 7 moles of ethylene oxide and about 1 to about 4 moles of propylene oxide with 1 mole of alkyl phenols having 1 to 3 $C_{4-12}$ alkyl groups.

22. A composition as in claim 12 wherein said nonionic surfactant comprises an adduct of about 1 to about 8 moles of ethylene oxide with 1 mole of alkyl phenols having 1 to 3 $C_{4-12}$ alkyl groups and terminally blocked by etherification with a linear or branched $C_{1-6}$ alkyl group.

23. A composition as in claim 12 wherein said nonionic surfactant comprises an ester of a saturated or unsaturated, linear or branched, $C_{8-24}$ fatty acid with diglycerol or polyglycerol.

24. A composition as in claim 12 wherein said nonionic surfactant comprises a diester of a saturated or unsaturated, linear or branched $C_{8-24}$ fatty acid with polyethylene glycol, polypropylene glycol or mixed ethylene oxide/propylene oxide block copolymer having a number average molecular weight in the range from about 44 to about 600.

* * * * *

UNITED STATES PATENT AND TRADEMARK OFFICE
CERTIFICATE OF CORRECTION

PATENT NO. : 5,030,280
DATED : July 9, 1991
INVENTOR(S) : Rainer Hoefer et al.

It is certified that error appears in the above-identified patent and that said Letters Patent is hereby corrected as shown below:

At Claim 16, Column 6, line 67, "of propylene oxide with mole of linear or branched," should read --of propylene oxide with 1 mole of linear or branched,--.

Signed and Sealed this

Sixteenth Day of February, 1993

Attest:

STEPHEN G. KUNIN

Attesting Officer

Acting Commissioner of Patents and Trademarks